(12) United States Patent
Khan

(10) Patent No.: US 9,858,969 B2
(45) Date of Patent: Jan. 2, 2018

(54) VIDEO RECORDING AND EDITING SYSTEM

(71) Applicant: HiPOINT Technology Services, Inc., Morton Grove, IL (US)

(72) Inventor: Masud Khan, Morton Grove, IL (US)

(73) Assignee: HiPoint Technology Services, INC, Morton Grove, IL (US)

( * ) Notice: Subject to any disclaimer, the term of this patent is extended or adjusted under 35 U.S.C. 154(b) by 0 days.

(21) Appl. No.: 15/011,421

(22) Filed: Jan. 29, 2016

(65) Prior Publication Data

US 2016/0225408 A1 Aug. 4, 2016

Related U.S. Application Data

(60) Provisional application No. 62/237,143, filed on Oct. 5, 2015, provisional application No. 62/109,430, filed on Jan. 29, 2015.

(51) Int. Cl.
| | |
|---|---|
| *H04N 9/80* | (2006.01) |
| *G11B 27/00* | (2006.01) |
| *H04N 5/93* | (2006.01) |
| *G11B 27/10* | (2006.01) |
| *H04N 5/77* | (2006.01) |
| *G11B 27/031* | (2006.01) |
| *G11B 27/34* | (2006.01) |

(52) U.S. Cl.
CPC .......... *G11B 27/105* (2013.01); *G11B 27/031* (2013.01); *G11B 27/34* (2013.01); *H04N 5/772* (2013.01); *H04N 5/93* (2013.01)

(58) Field of Classification Search
CPC ............. H04N 9/80; H04N 5/93; G11B 27/00
USPC .......................... 386/241, 239, 243, 278, 280
See application file for complete search history.

(56) References Cited

U.S. PATENT DOCUMENTS

| | | | | |
|---|---|---|---|---|
| 5,974,219 A | * | 10/1999 | Fujita ................ | G06F 17/30825 348/E5.067 |
| 2006/0233529 A1 | * | 10/2006 | Moriya ................ | G11B 27/034 386/241 |
| 2008/0294649 A1 | * | 11/2008 | Murata ............. | G06F 17/30855 |
| 2014/0108928 A1 | * | 4/2014 | Mumick ............... | G06F 3/0488 715/716 |

* cited by examiner

*Primary Examiner* — Daquan Zhao
(74) *Attorney, Agent, or Firm* — Richards Patent Law P.C.

(57) ABSTRACT

A video recording system including: a camera sensor and a controller configured to: continuously store video in a temporary file storage arrangement from the camera sensor, display a user interface including displaying the video and a record button, upon receiving an activation of the record button at a first time, recording the first time as a start location, updating the user interface to include a stop recording button, upon receiving an activation of the stop recording button, at a second time, marking the second time as a stop location, display a user interface including one or more selectable start time points that precede the first time, receive a selection of a start time point of the start time points, generate a video file from a subset of the temporary file storage arrangement, the video file beginning at a video frame associated with the start time point.

6 Claims, 14 Drawing Sheets

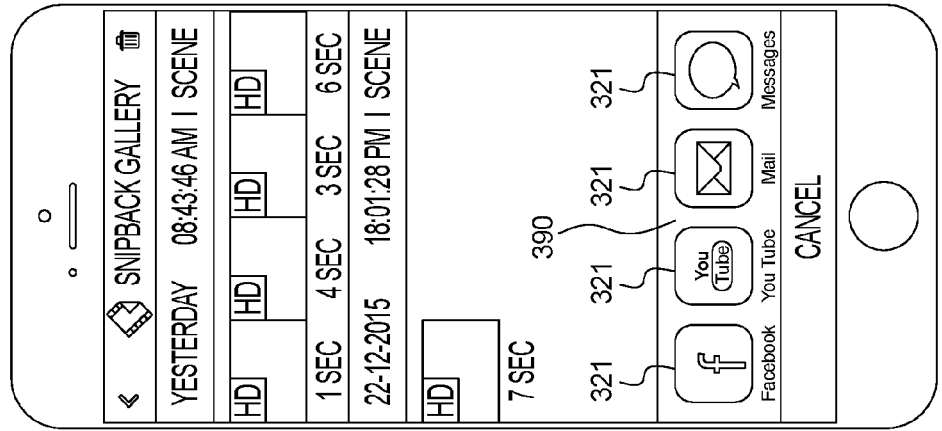
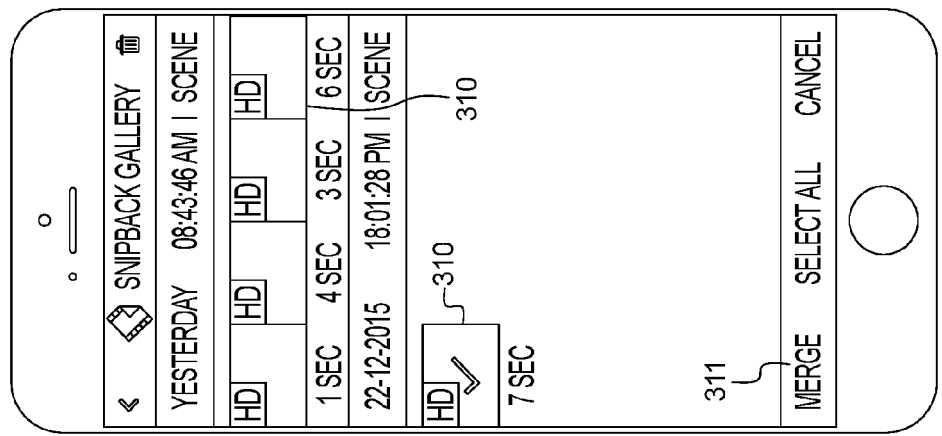
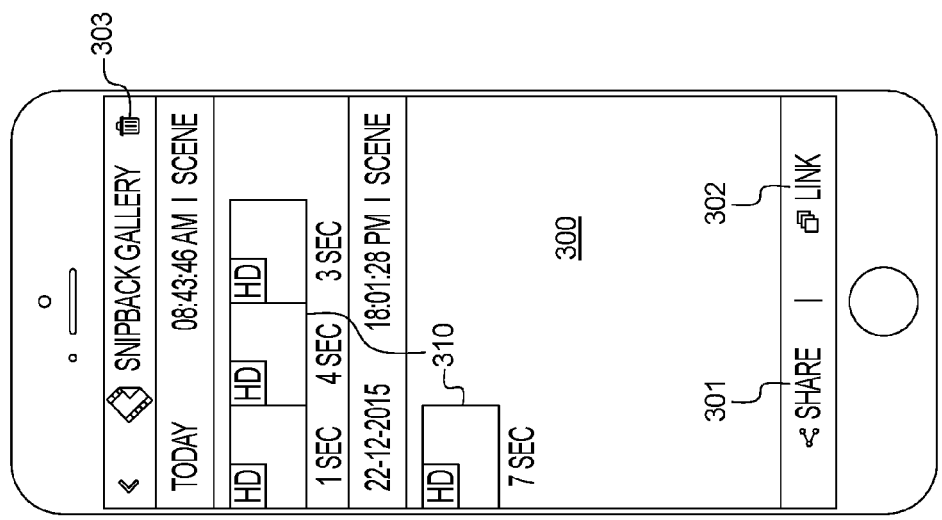

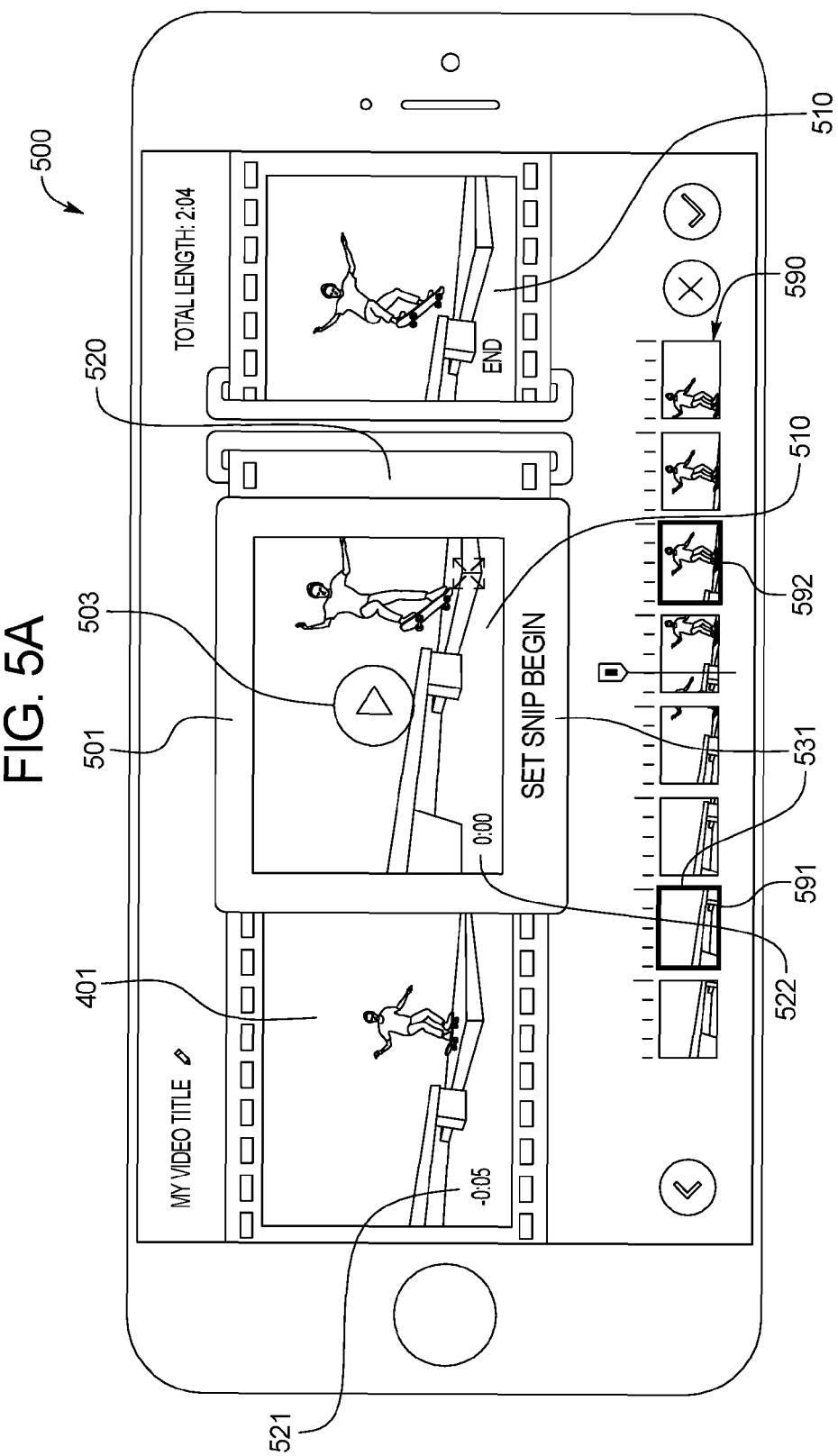

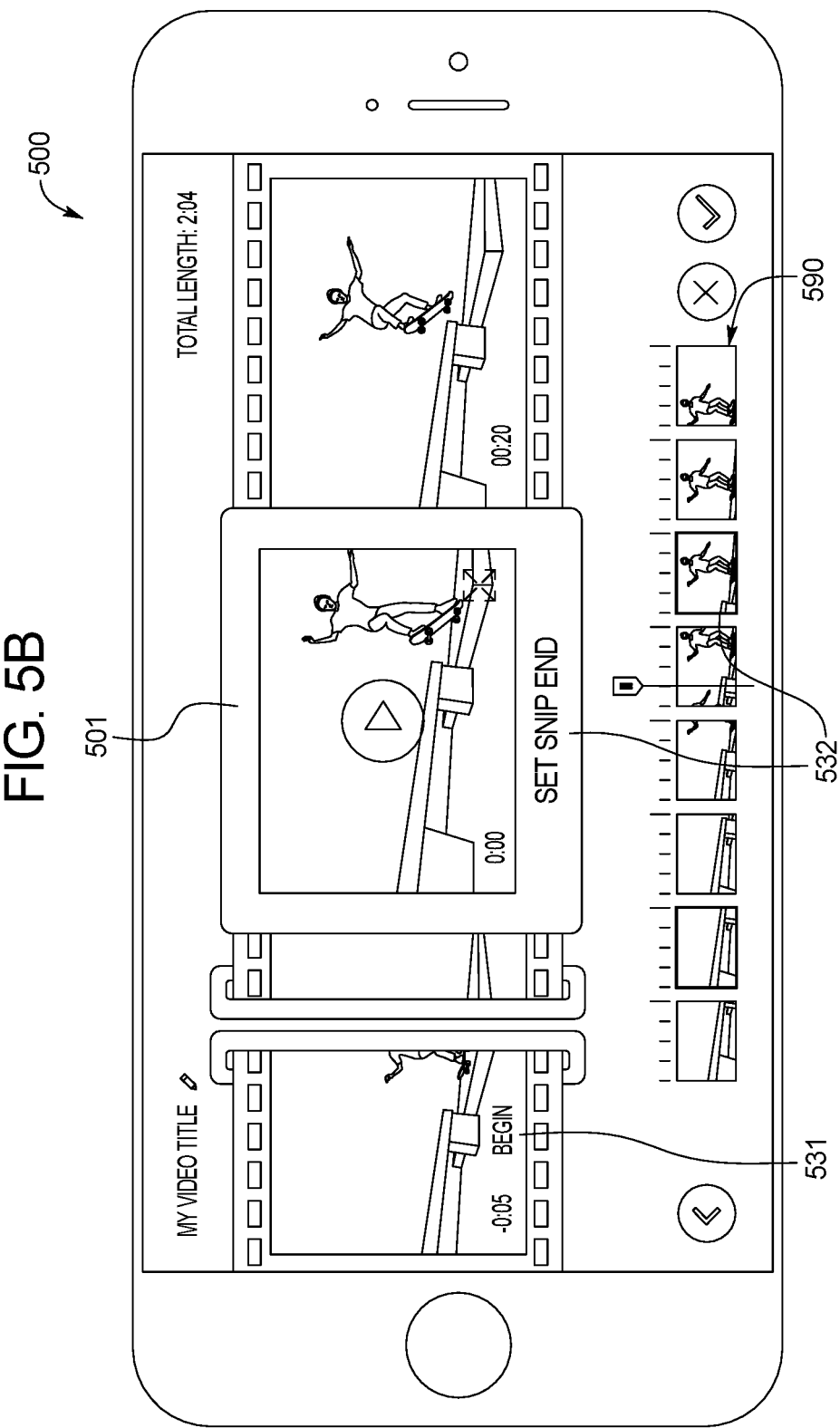

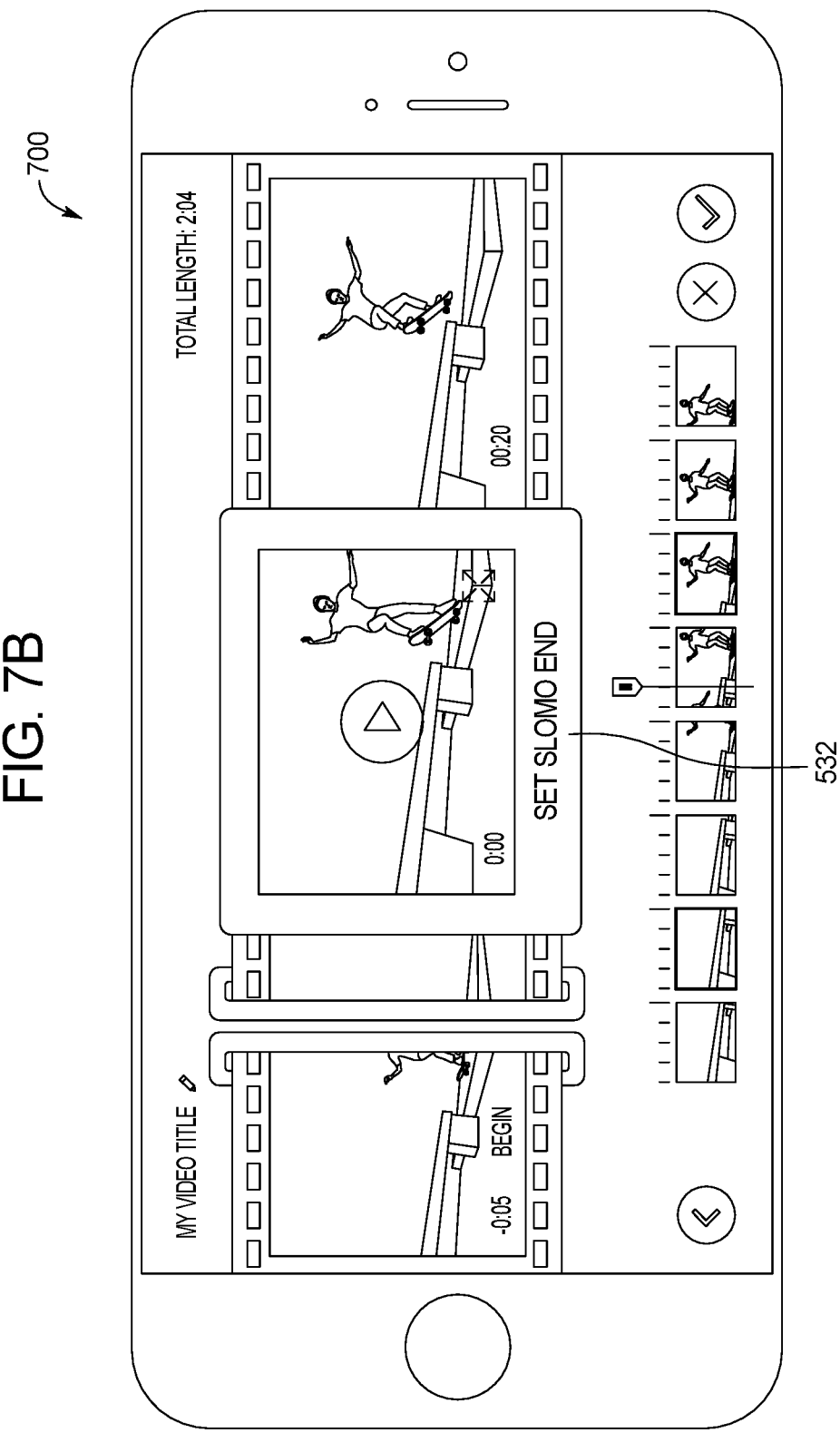

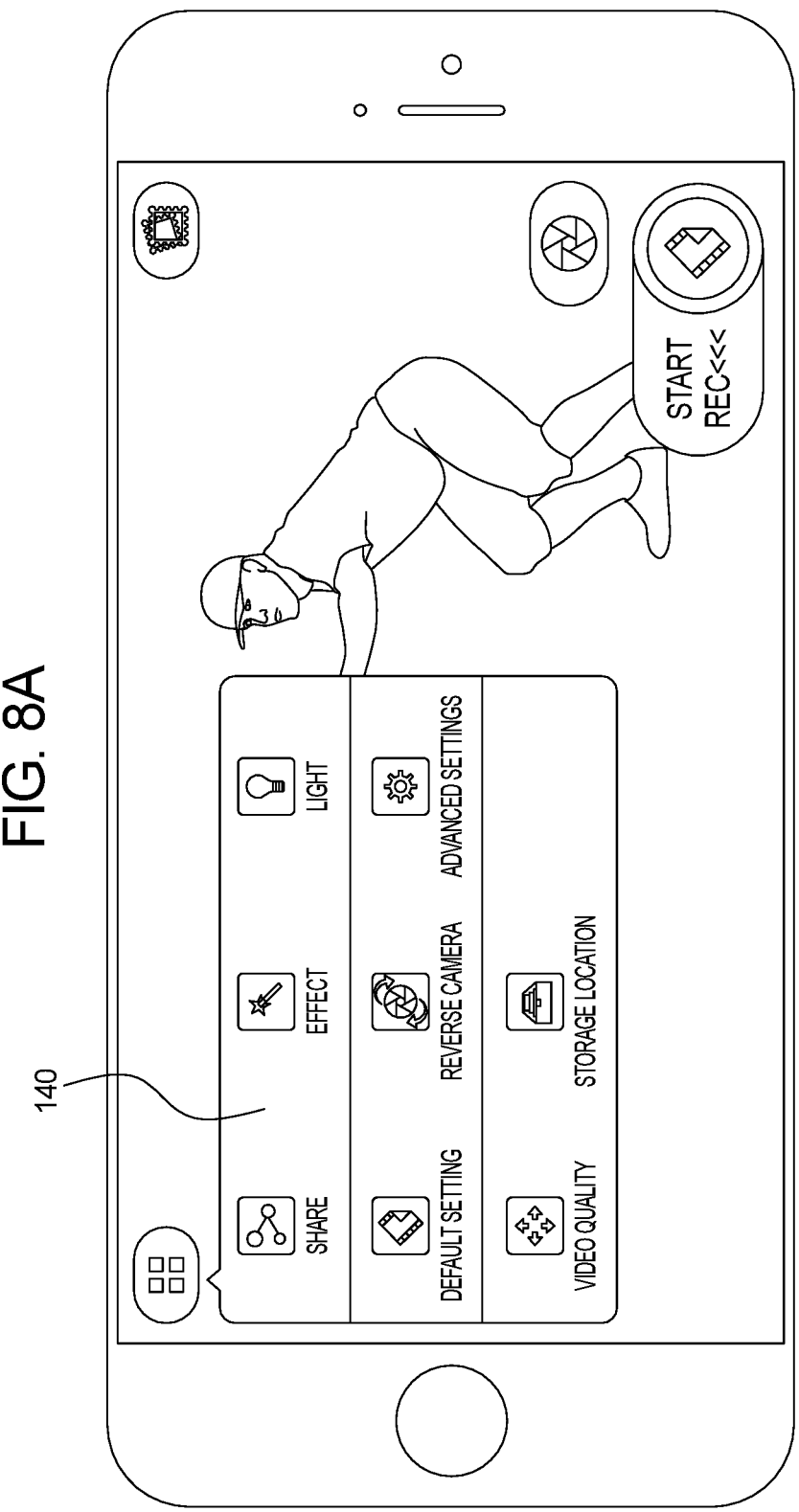

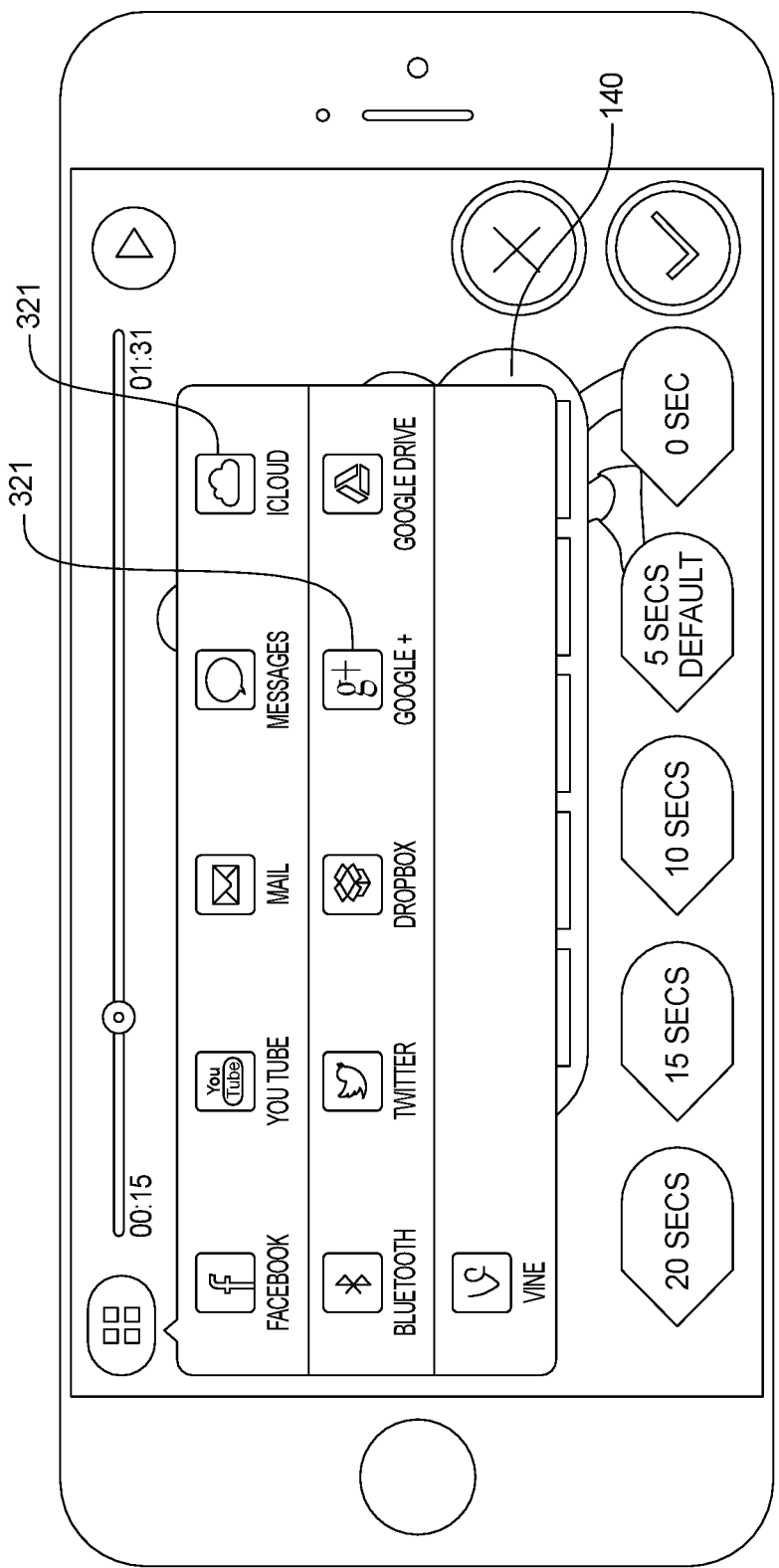

VIDEO RECORDING AND EDITING SYSTEM

CROSS-REFERENCE TO RELATED APPLICATIONS

This application incorporates by reference and claims the benefit of priority to U.S. Provisional Patent Application No. 62/237,143 filed Oct. 5, 2015, and U.S. Provisional Patent Application No. 62/109,430 filed Jan. 29, 2015.

BACKGROUND OF THE INVENTION

The present subject matter relates generally to a video recording and editing system and method. More specifically, the present invention relates to a video recording and editing system and method that enables users to capture video recorded in a traditional manner, but also to capture video before a user indicates that recording is to begin and to edit said video via an innovative interface.

When someone records a video typically more video is captured than is actually wanted or needed. This is a result of basic limitations on how the video recording process works. As an example of one of these limitations, a user may be observing their child's soccer game and decide that they wish to record a video of their child playing the game; more specifically they want to record the child doing something memorable (e.g., the child kicking a ball, making nice defensive play, or scoring a goal). In hopes of catching such a notable event on video the user must start recording before the event occurs and keep recording until after such an event takes place. The result of this process is that the user may have recorded several minutes of video to capture a much shorter moment. These large video files, containing minutes of uninteresting footage, may take up a good deal of space on a storage medium and since every computing device, rather it be a camera, smartphone, tablet, personal computer, or other computing device has a finite amount of memory; eventually the storage of extraneous recorded video will limit the functionality of the video recording device.

Another limitation of the traditional video recording process is that the larger video files are much more difficult (if not impossible) to conveniently share via email, social media, or other video sharing methods. Most mediums for sharing a virtual file have limits on the size of file that may be uploaded and sent. Additionally, most mediums for sharing files also have limits on the size of file that can be received by a user and the total amount of storage space available to a user to store such files. In today's social media driven world, the need to substantially edit a video file down to an appropriate size before sending or posting online is inconvenient and a hindrance to the pace at which news and other important events are shared with the world.

Matching closely with the size limitations of the traditional video recording process, larger video files typically contain longer videos with a good deal of uninteresting content. This means there is also a limitation on the traditional video recording process that requires the use of cumbersome editing software (to apply effects like slow-motion, and/or add music, etc.) to create a video relevant in today's fast paced world.

Editing video files is also cumbersome due to the time it takes for a video editing system to create the new video based on the specified edits (e.g. trim, cut out segments, apply special effects, etc.). Also, the creation of new versions of from an original source file creates a new file that takes up space on the user device. For example, if a user takes a ten minute video, and then creates three new versions from this video, one containing the first three minutes, then second containing the next four minutes, and the final containing the last three minutes, then the user now has four files, the original source video which is ten minutes long, and three derived versions taking sections from this video, totaling in this case ten more minutes of video. This method takes up valuable space on the user device, and is cumbersome due to the time it takes for the user device to generate the new video file versions.

All of these limitations stem from the biggest issue with traditional video recording and editing methods: that all such devices create and present video files that are tied to this input, and modify such video files per the specified edits that the user makes. Such a method does not allow users to go back in time and get missed video, nor does it allow for the quick creation of alternate versions without a user having to create new files for each such version.

Another common limitation is that video editing UI's (user interfaces) are cumbersome and intimidating, and often require a steep learning curve. Consequently the typical user does little to no editing of video.

Accordingly, there is a need for a user-friendly video recording and editing system that dissociates perception from reality, giving users more flexibility to capture and edit desired video. Such a system could easily capture events prior to a user's input, and make virtual edits without the need to create new video files. In such a system a user could add video captured prior to the user-initiating recording via a user input, and then make unlimited version from such a source file without taking significant space.

BRIEF SUMMARY OF THE INVENTION

To meet the needs described above and others, the present invention provides a video recording system that permits the user to "record" events that occurred before the user presses a button to initiate recording. More specifically, the video recording system permits users to retroactively add footage to the beginning of a video recording. This process may be known as and is referred to herein as adding a "snipback." Videos, such as short videos or clips, made using the snipback process may be known as and are referred to herein as "snips." The snipback capable video recording system may be embodied in a video recording application that may be run on mobile devices (such as iOS, Android, and Windows Mobile devices), personal computers, and digital cameras (such as those produced by Nikon and GoPro).

In one embodiment of the video recording system, the system may feature a file storage arrangement that utilizes temporary files to store video captured by a device's (smartphone, computer, digital camera, etc.) camera while the snipback system is running on the device. This file storage arrangement may function similarly to a circular video buffer: a first in, first out (FIFO) file storage arrangement. Such an arrangement will record pre-defined intervals of video and then eventually write over these pre-defined intervals of video with new intervals of video as time elapses and more video is recorded by the system. This series of pre-defined video intervals, that are constantly being recorded by the system while the snipback application is running, allows the system to capture moments of video before the user actually presses the record button.

This embodiment of the video recording system may exist as a mobile application on a device or be integrated into the device's native recording software and an illustrative example of this embodiment in use may be that of a parent recording their child playing soccer. The parent may have the snipback application installed on their smartphone. When the application is running, the parent need only hold their mobile device with the device's camera able to view the on field action. The screen of the mobile device running the snipback application will show what is being passively recorded (within a virtual buffer arrangement wherein video is constantly recorded and discarded) and then, if on the field, the parent's child scores a goal or some other notable event occurs, the parent can press the record button and capture as much of the event as they can (e.g., the post goal celebration). Once the notable action has ended, the parent can stop recording in real time and then may be presented with a thumbnail or video frame based interface by the application enabling them to select how far they would like to snipback into the past from the moment they first tapped the record button. This allows the parent to essentially go "back in time" and capture portions of a moment of the play that they would have otherwise missed if they had not actually tapped the record button before the event occurred.

Additionally, this embodiment may include the ability for the snipback application to shorten the video (e.g. alter the beginning and/or end point) or apply special effects to the video utilizing the same basic interface used when selecting how far to snipback. The system may then discard all the unused video that was actively recorded by the user and that was stored in temporary files; keeping only the edited version of the video clip. Alternatively the user can save a draft version of the file that would virtually save the file with the user of time markers, which would be reflected during video preview with the user of a custom video player.

In an embodiment, a video recording system includes: a camera sensor; a controller in communication with the camera sensor; a memory in communication with the controller, the memory including a video recording application that, when executed by the controller, cause the controller to: continuously store video from the camera sensor in a temporary file storage arrangement, display a user interface including displaying the video and a record button, upon receiving an activation of the record button at a first time, recording the first time as a start location, upon receiving an activation of a stop recording button, at a second time, marking the second time as a stop location, display a user interface including one or more selectable start time points that precede the first time, receive a selection of a start time point of the start time points, generate a video file from a subset of the temporary file storage arrangement, the video file beginning at a video frame associated with the start time point.

In some embodiments, the subset ends at a video frame associated with the stop location. In some embodiments, the video recording application further causes the controller to: display a user interface including one or more selectable end time points that follow the second time, and receive a selection of an end time point of the end time points; wherein the video file ends at a video frame associated with the end time point.

In some embodiments, the video recording application further causes the controller to: display a user interface including one or more selectable video files, receive a selection of a first video file, receive a selection of a second video file, generate a merged video file that includes the selected first video file concatenated with the selected second video file.

In some embodiments, the video recording application further causes the controller to: receive a selection of a video file to crop, display, on a user interface, one or more selectable crop start time points of the video file, receive a selection of a crop start time point from the one or more selectable crop start time points, display, on the user interface, one or more selectable crop end time points of the video file, receive a selection of a crop end time point from the one or more selectable crop end time points, generate a second video file from the video file by removing video between the crop start time point to the crop end time point.

In some embodiments, the video recording application further causes the controller to: receive a selection of a video file to add a special effect to, receive a selection of a special effect, display one or more selectable begin time points that indicate where the special effect should begin, receive a selection of a begin time point of the one or more selectable begin time points, display one or more selectable finish time points that indicate where the special effect should finish, receive a selection of a finish time point of the one or more selectable finish time points, and generate a second video file from the video file by applying the special effect to video of the video file between the begin time point to the finish time point.

In some embodiments, the activation of the record button and the activation of the stop recording button are caused by a swipe gesture.

In some embodiments, a video recording system includes: a camera sensor; a controller in communication with the camera sensor; a memory in communication with the controller, the memory including a video recording application that, when executed by the controller, cause the controller to: continuously store video from the camera sensor in a temporary file storage arrangement, display a user interface including displaying the video and a stop recording button, upon receiving an activation of the stop recording button at a first time, recording the first time as an end time point, display a user interface including one or more selectable start time points, receive a selection of a start time point of the start time points, generate a video file from a subset of the temporary file storage arrangement, the video file beginning at a video frame associated with the start time point and ending at a video frame associated with the end time point.

In an embodiment, a video recording system including: a camera sensor; a controller in communication with the camera sensor; a memory in communication with the controller, the memory including a video recording application that, when executed by the controller, cause the controller to: continuously store video in a temporary file storage arrangement from the camera sensor, display a user interface including displaying the video and a record button, upon receiving an activation of the record button at a first time, record the first time as a start time point, upon receiving an activation of a stop recording button, at a second time, mark the second time as an end time point, display a user interface including: a coarse selection bar including one or more thumbnail frames depicting frames of the temporary file storage arrangement, wherein the coarse selection bar includes a start time slider and an end time slider, wherein both the start time slider and the end time slider may be moved along the coarse selection bar using a drag gesture, wherein each location along the coarse selection bar corresponds to a time point of the video in the temporary file storage arrangement; and a fine selection bar that toggles between a start selection mode and an end selection mode, wherein the fine selection bar includes a scrollable series of video frames to permit the user to scroll linearly along the video of the temporary file storage arrangement in the forward and backward directions, wherein, in a start selection mode, in response to a scroll gesture, the start time point is set to a selected frame of the movable series of video frames, wherein, in an end selection mode, in response to a scroll gesture, the end time point is set to a selected frame of the movable series of video frames, wherein, in response to the user dragging the start time slider to a first location, the start time point is updated based on a time point corresponding to the first location and the fine selection bar is placed in a start selection mode and the selected frame is updated to the start time point, wherein, in response to the user dragging the end time slider to a second location, the end time point is updated based on a time point corresponding to the second location and the fine selection bar is placed in an end selection mode and the selected frame is updated to the end time point, and generate a video file from a subset of the temporary file storage arrangement, the video file beginning at a video frame associated with the start time point and ending with the video frame associated with the end time point.

In an embodiment, the video recording application causes the controller to: update the user interface to include a stop recording button.

An object of the present invention is to address the issue of traditional video recording systems being unable to capture moments before recording is initiated. There is no known way to actually reverse time, so if a user wishes to capture an interesting moment they must already be recording a given event. Typically, memorable events will occur during an organized event (e.g., soccer game, wedding, first communion, etc.) but these events may span hours with only a few moments being interesting (e.g., a child scoring a goal). Traditional recording would require a user to record most, if not all of these events to capture every possible moment in which a memorable event could occur resulting in enormous video files. The snipback application allows instead for a notable event to occur while the user watches passively and gives them the ability to still capture the event if they so choose via an automated recording system constantly running in the background of the application. Storage space on a users device may be preserved by a virtual buffer arrangement wherein video beyond a certain length will automatically be deleted.

An advantage of the invention is that, in many cases, it circumvents the need to shorten the length of a video. The present system allows users to create clips containing minimal to no superfluous video at the time the event is actually happening. This allows the user to more quickly share the information with others and more accurately report on what occurred.

Yet another advantage of the invention is that it saves space on a user's device. By utilizing a more efficient manner of recording video clips and the deletion of unused portions of said clips, a user can save as much as ninety percent of storage space that would be used on their devices if they were to use the standard recording methods.

Yet another advantage of the invention is that the user can create alternate virtual versions of the original clip (source clip), without having to create new video files, thereby saving significant space.

Still yet another advantage of the invention is that it makes for more easily shareable clips. The ability to easily make smaller clips, whether real or virtual, resulting from both the presence of a snipback feature and easy trimming and editing interface, results in a user having clips that can be more easily shared on social media and via email than larger, unedited video files. In use, virtual clips would generate temporary files to be shared, and then after a designated time period be automatically deleted.

A further advantage of the invention is that it reduces clutter in a user's video library. By eliminating the need to start/stop recording in hopes of capturing a worthwhile event, the user will have far fewer unwanted video clips in their video library. This smaller amount of clips saves space, but also reduces overall clutter in a video library, making finding meaningful clips much easier. Clutter would also be reduced by the grouping of virtual and real versions of files with their source file.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 3A is a screen illustrating a media gallery of the video recording system.

FIG. 3B is a screen illustrating the video recording system's functionality for merging video files.

FIG. 3C is a social media sharing screen of the snipback media gallery illustrating the social media sharing feature.

FIG. 5A is a screen illustrating the snipback edit video interface of the video recording system permitting the user to edit the desired starting point of the video.

FIG. 5B is a screen illustrating the snipback edit video interface of the video recording system permitting the user to edit the desired endpoint of the video file.

FIG. 7B is a screen illustrating the special effects interface of the video recording system setting an endpoint of a special effect.

FIG. 8A is a screen illustrating the sharing and settings menu.

FIG. 8B is a screen illustrating the sharing options displayed by the sharing and settings menu.

DETAILED DESCRIPTION OF THE DRAWINGS

Figure 1A:
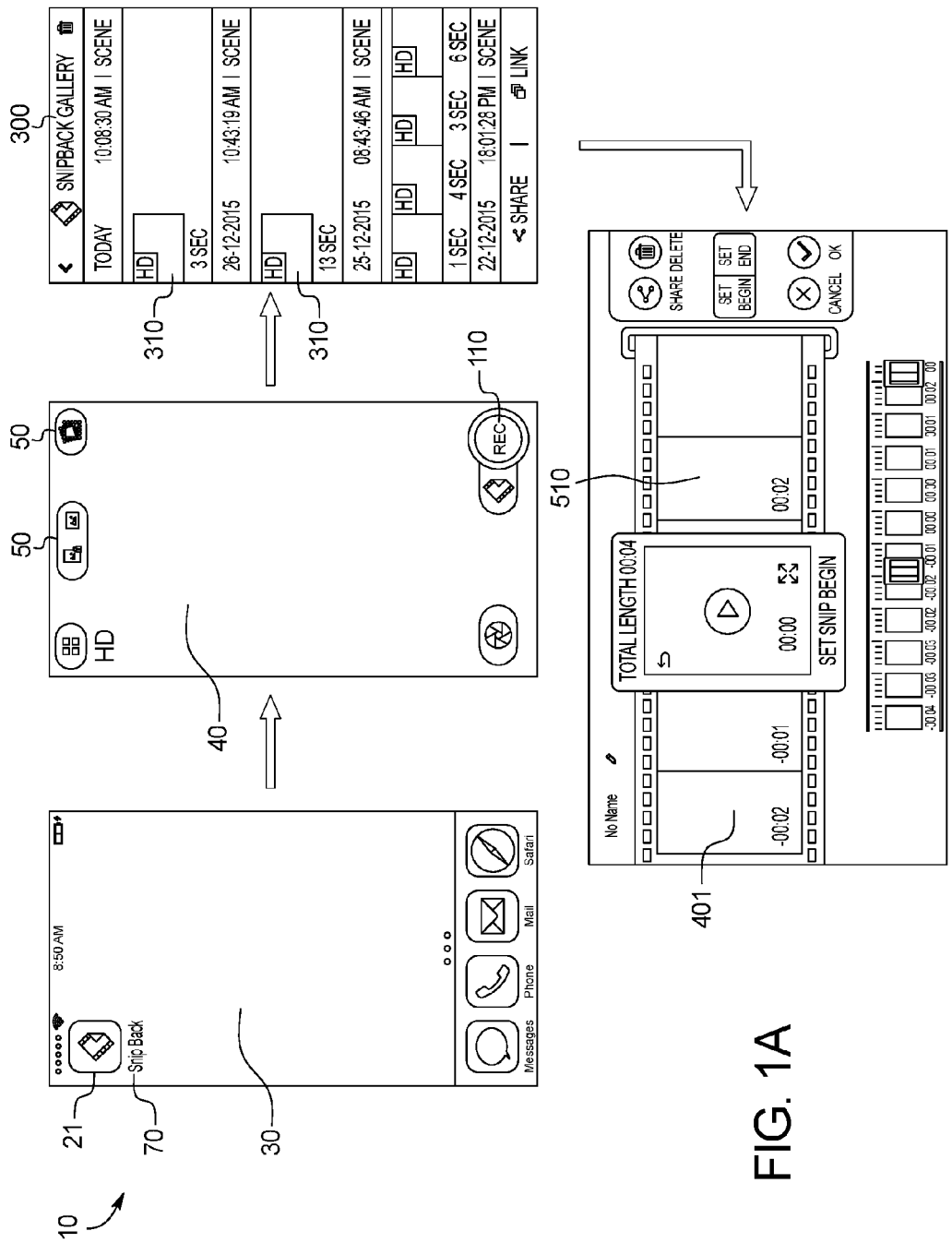
FIG. 1A is a screen illustrating a snipback video recording system embodied as a standalone application on a user device.

FIG. 1A is a series of screens illustrating a video recording system 10 embodied as a standalone application 70 on a user device 30. As shown in FIG. 1A, a video recording system 10 may exist as a standalone application 70 on a user device 30, (e.g., smartphone, tablet, personal computer, digital camera, or other computing device). To launch the application 70, a user may only need to tap the application's touchscreen icon 21 in the same manner used to launch most smartphone applications. Once the application 70 is opened, the user device 30 may display the video recording system's 10 graphical user interface (GUI) 40. This GUI 40 may feature touchscreen controls 110 that allow a user to select when they would like to begin recording video 510. Further shown in FIG. 1A, once a video 510 is recorded, it may be saved as a video file 310 in the user device's 30 memory 138 and accessible via the system's 10 media gallery 300. When a video file 310 is saved, it may then be accessed in the gallery 300 and the file 310 may include both recorded video 510 and temporary video 401. The temporary video 401 may represent video 401 captured before a user pressed the touchscreen record button 110, allowing the user to save a video file 310 that captures moments that would have been otherwise missed.

Figure 1B:
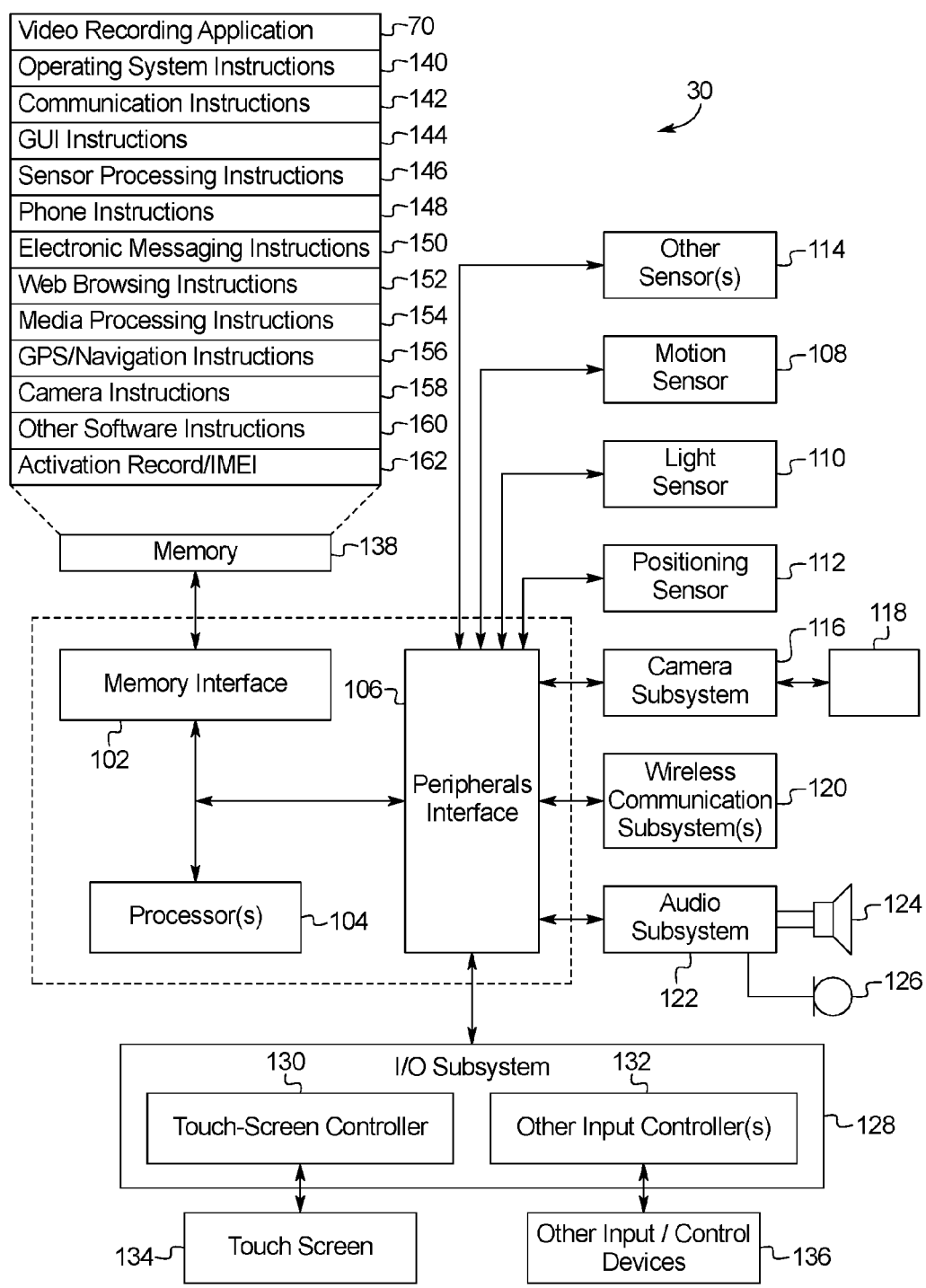
FIG. 1B is a schematic diagram illustrating an example of a standalone video recording application running on a user device.

FIG. 1B is a schematic diagram illustrating an example a standalone video recording application 70 running on a user device 30. As shown in FIG. 2, the user device 30 maybe a mobile device, such as a smartphone, running a standalone video recording application 70 to provide the functionality described herein. A user may install the video recording application 70 on his or her user device 30 and launch it via touchscreen icon 21. The user device 30 may include wireless communication subsystem 120 to communicate with one or more media sharing mediums.

Figure 2A:
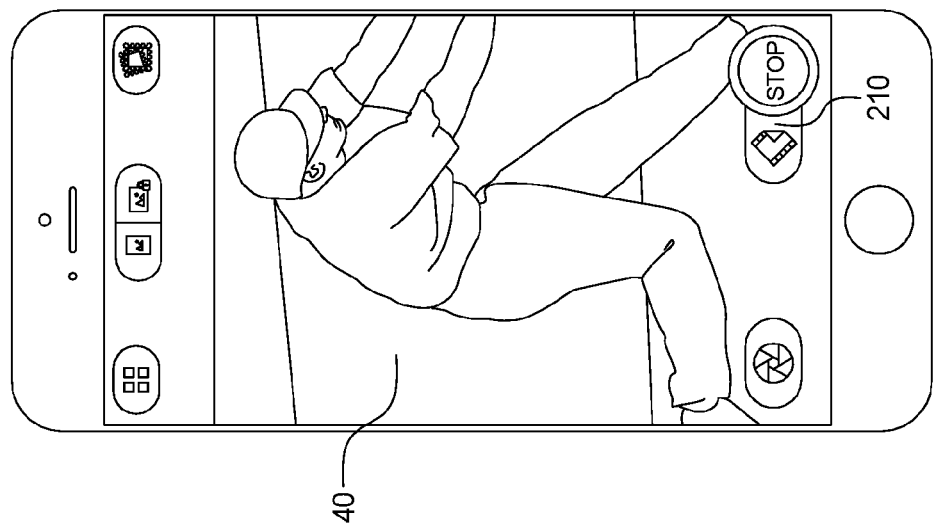
FIG. 2A is a screen illustrating the graphical user interface of the video recording system running on a user device.

FIG. 2A is a screen illustrating the video recording system's 10 graphical user interface 40 running on a user device 30. As shown in FIG. 2A, the video recording system's 10 GUI 40 may resemble a standard smartphone camera interface with touchscreen controls 50. These controls may be located around the perimeter of the GUI 40 and include: a record button 110, access to the snipback media gallery 120, viewing position (landscape or portrait) lock 130, sharing and settings menu 140, and the shutter 150. Once the application 70 is opened, the snipback recording system 10 may begin recording temporary video 401 into a temporary file storage arrangement 100 automatically that allows the user to capture events that occur before they press the record button 110.

Figure 2B:
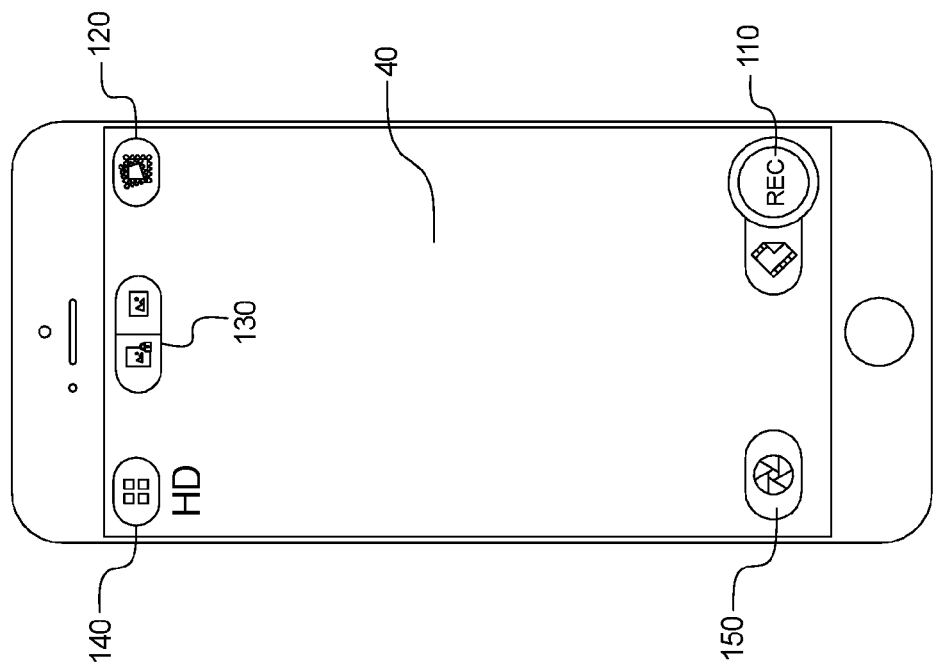
FIG. 2B is a screen illustrating the graphical user interface of the video recording system recording a video.

FIG. 2B is a screen illustrating the snipback capable video recording system's 10 graphical user interface 40 recording a video 510. As shown in FIG. 2B, when a user taps the touchscreen record button 110, the system 10 may mark a starting point 531 of a video 310. Also shown in FIG. 2B, when the user taps the record button 110 it may change into a stop recording button 210. The user may simply need to tap the button 210 again to stop actively recording video. When the user taps the button 210, the system 10 may mark an endpoint 532 of the video 310.

FIG. 3A is a screen illustrating the snipback capable video recording system's 10 media gallery 300. As shown in FIG. 3A, when a user taps the snipback media gallery button 120 located on the GUI 40, they may be taken to the snipback media gallery 300. The snipback media gallery 300 may feature all the video files 310 recorded by the snipback system 10 as well as touchscreen controls including a share button 301 for posting video files 310 to social media sites, a link button 302 used for combining videos, and a delete button 303 for deleting unwanted video files 310. The media gallery 300 may read videos and photos from the system's native photo and video gallery, such as a "Photos" gallery on the IPhone. The video recording application 70 may be used to edit the videos and photos from the system's native photo and video gallery. Once saved, video files 310 generated by the standalone video recording application 70 may be moved to the system's native photo and video gallery.

FIG. 3B is a screen illustrating the snipback capable video recording system's 10 merging video files 310. As shown in FIG. 3B, the video recording system 10 may allow a user to merge multiple video files 310 into a single video file 310. To merge videos, the user first accesses the snipback media gallery 300 and taps the link button 302. The system 10 may then allow the user to select those video files 310 they wish to merge, and then combine them by pressing the merge button 311. In an embodiment, after being merged, the video files 310 selected for merger may be assembled into one video file 310, containing the footage from the existing separate video files 310 that, when viewed, will play consecutively. In another embodiment, the newly created merged video file 310 may be a virtual file 317 referencing the selected video files 310.

FIG. 3C is a social media sharing screen 390 of the snipback media gallery's 300 social media sharing feature. As shown in FIG. 3C, a user may quickly share video file's 310 directly from the media gallery 300 by tapping the share button 301. The share button 301 may then display a set of links 321 to various video-sharing mediums (social media, email, text messaging, etc.). The user may then select from the set of links 321 presented to share the video file 310 with the chosen sharing medium.

Figure 3D:
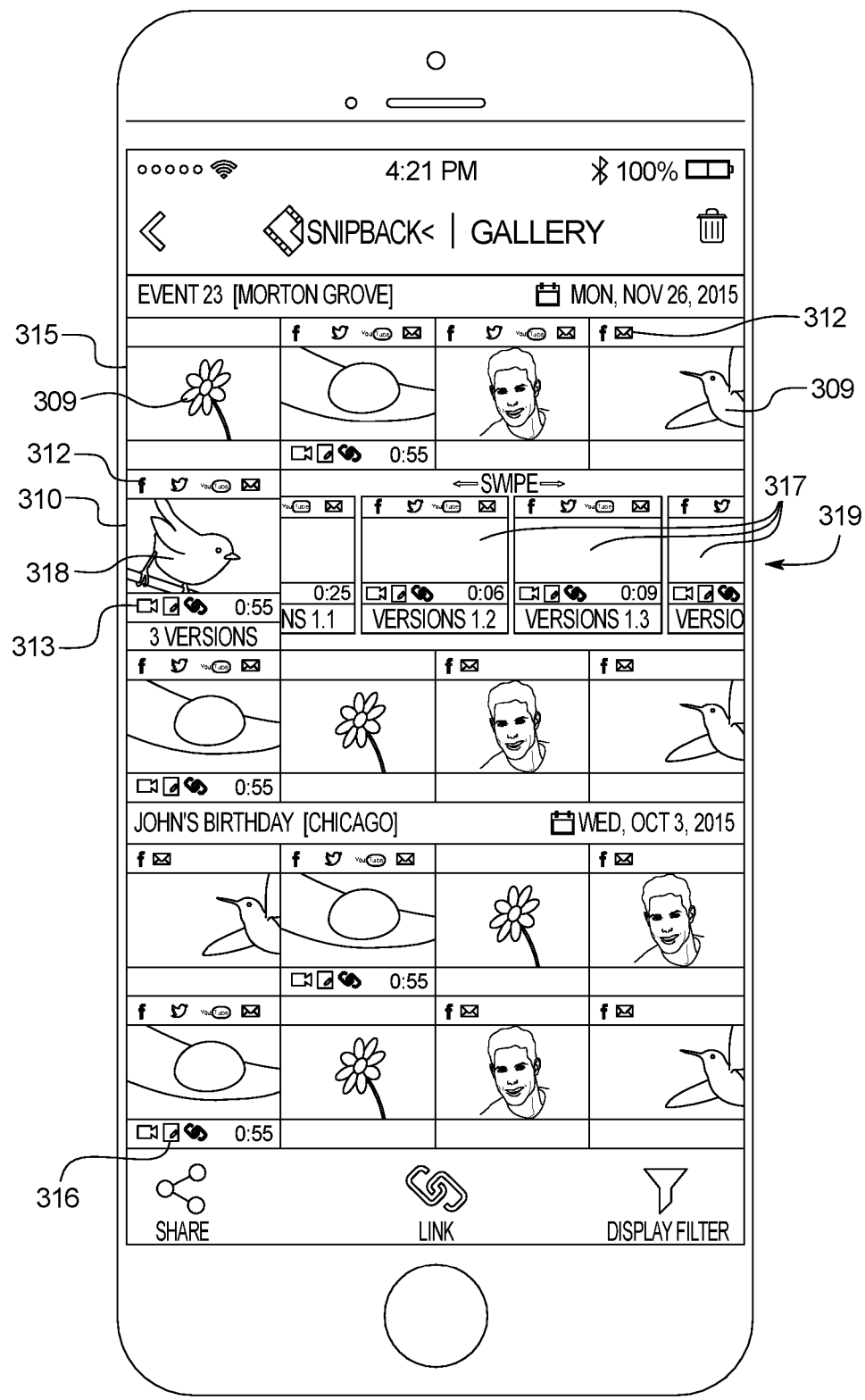
FIG. 3D is a social media sharing screen of the snipback media gallery illustrating virtual files.

FIG. 3D is another example of the snipback media gallery 300 for videos 310 and images 315. In the embodiment shown, thumbnails 309 for each video file 310 or image in the gallery 300 may include sharing icons 312 displayed over the thumbnail 309 to specify if that video file 310 or image has been shared. The sharing icons 312 may be displayed along the top of the thumbnail 309 to indicate what method or on what social network the video file 310 was shared, for example, the sharing icons 312 may indicate sharing via email, sharing on social networks such as Facebook®, Twitter®, YouTube®, etc. Additionally, the thumbnails 309 may include action icons 313 that show if the video has any memo notes (e.g. pending tasks) or if it is a multi link video. The action icons 313 may be displayed on bottom left of a thumbnail 309.

A thumbnail 309 of a video file 310 may now include a designation 316 if it is in a draft mode. In draft mode, the video file 310 remains editable and all changes may be made virtually, meaning no new file was created. The resulting virtual files 317 are managed via time markers that include a starting point 531 and endpoint 532 marking the location of the virtual file in the temporary file storage arrangement 400 or within another video file 310. This allows for multiple video clips to be present in the gallery 300 from the same source video.

Virtual files 317 are defined by time markers that may by interpreted by the system 10 to correctly display the virtual files 317. Each time marker may include a starting point, an endpoint, and a reference to one or more source files 317. During playback, the time markers may be used to add video (for example, in the case of merged videos 310) or remove video (for example, in the case of a trimmed video) in real-time from the source video 318. Virtual files 317 may be shared, in which case a temporary new file may be created that reflects the virtual file 317 as defined by the time markers, and then after a certain time the new file gets automatically deleted. As described herein video files 310 may be provided as actual files or virtual files 317 with reference to an actual file.

The gallery 300 may display versions of virtual files 317 on their own row 319. The source video 318 may include the word "SOURCE" displayed on it, while each virtual file 317 may have an associated version number. The version number of a virtual file 317 may be displayed below the virtual file 317. In the example shown, there are four versions in the second row. To the right of the source are the versions. If the gallery 300 includes more than three virtual files 317, the user may swipe in that row to scroll through the various versions. Below each virtual file 317 is the version number (e.g. 1.1, 1.2, etc.). When a user creates a virtual file 317 from an existing virtual file version, the thumbnail 309 may get smaller and another degree may be added on the versioning count (e.g. 1.1.2, 1.1.2). All these versions are virtual, so the user may create as many as he or she likes without taking up any more space. In an embodiment, the gallery 300 may include a display filter to permit the user to filter media files by type (e.g., video or photo), by tags, by source, by notes, etc.

Figure 4:
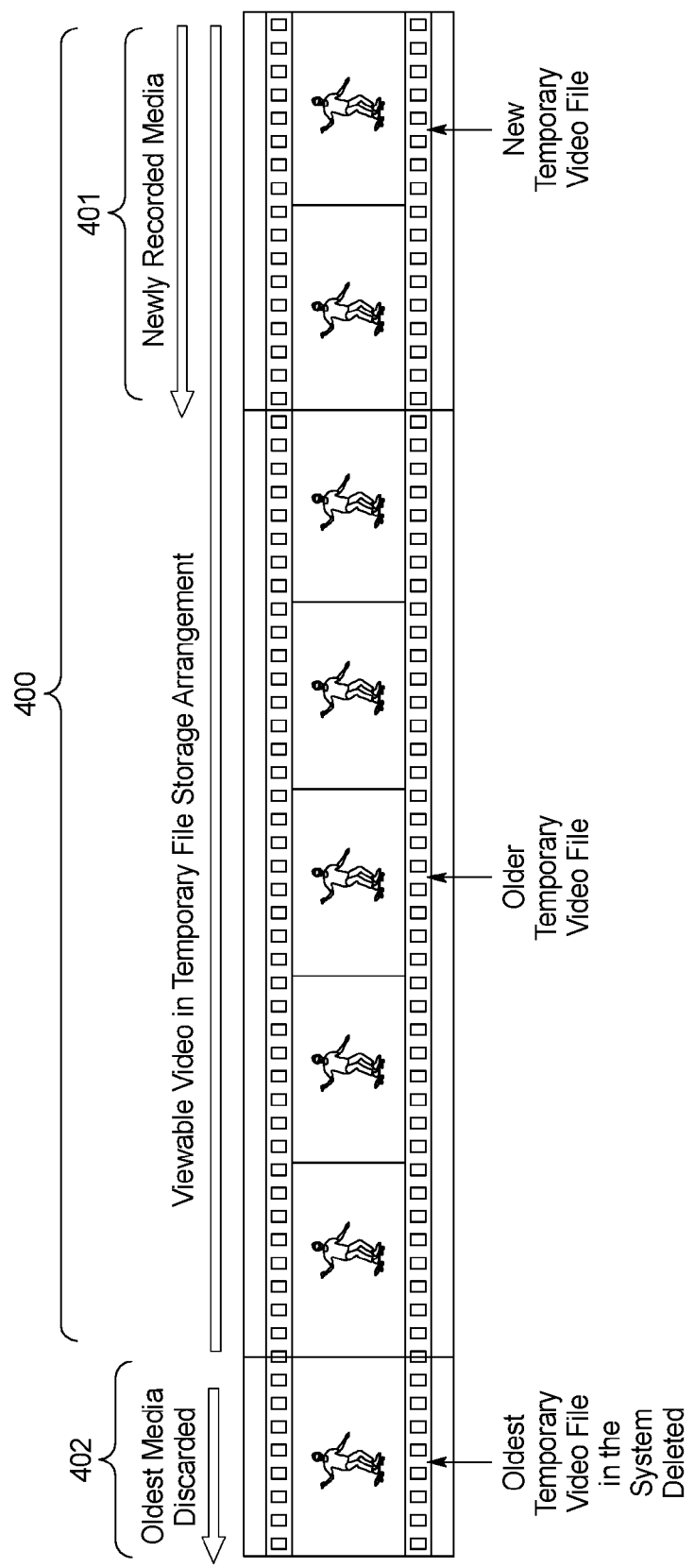
FIG. 4 is a diagram of how a temporary file storage arrangement may function to store video.

FIG. 4 is a diagram of how a temporary file storage arrangement 400 may function to store video 401. As shown in FIG. 4, a temporary file storage arrangement 400 continuously receives recorded video 401 from the camera 118 and stores the video 401 for a pre-defined time period in a temporary file storage arrangement 400. After this pre-defined period of hold time elapses, the temporary video 401 is deleted 402 to make room for newly recorded video 401. This functionality may be present in the video recording system 10 to help manage the amount of video recorded by the system 10. The temporary file storage arrangement 400 is useful because the snipback system 10 records video constantly without the user having to press the record button 110. Without the use of a temporary file storage arrangement 400, the amount of video 401 recorded by the system 10 would exceed storage limits. The temporary file storage arrangement 400 may enable the snipback system 10 to hold a pre-defined amount of video 401 (e.g., thirty seconds, a minute, five minutes, etc.) in separate temporary files recorded in the past that will be eventually discarded, effectively balancing storage space conservation against the risk of missing an important moment.

In an embodiment, each temp file is thirty seconds long, and temporary files of the temporary file storage arrangement 400 are added every thirty seconds. In an embodiment, only two temp files are kept at a time, unless included in a video 310. In some embodiments, in order to switch between files, recording is stopped for one temp file and re-started to begin filling another temporary file. Those of skill in the art will recognize that such recording is continuous because the starting and stopping process does not introduce sizeable delays that would be noticeable to the user.

FIG. 5A is a screen illustrating the snipback interface 500 of the video recording system 10 adding video 401 held in a temporary file storage arrangement 400 to a recorded video clip 510. As shown in FIG. 5A, after the user captures a recorded video clip 510, the snipback system 10 may allow the user to add temporary video 401 to the beginning of the recorded video clip 510 via a snipback interface 500. The snipback interface 500 may display the recorded video clip 510 and temporary video 401, with the temporary video denoted with a negative time marker 521 that indicates how far in the past the temporary video 401 occurred from the time the user tapped the record button 110 and a zero time marker 522 indicating when the user tapped the record button. Also shown in FIG. 5A, to incorporate temporary video 401 the snipback interface 500 may allow the user to move a viewing window 501 via touchscreen controls and scroll backwards in time to the point 531 at which they wish their video 310 to begin. The viewing window 501 may display thumbnail images 502 of the recorded video 510 and temporary video 401 as the user scrolls through it. This scrolling effect may be achieved via touchscreen controls that allow a user to drag their finger horizontally along the thumbnail images 502 to the right for forward scrolling in time and to the left for backwards scrolling in time. These thumbnail images 502 may allow the user a glimpse of what is occurring at a given instant in the recorded video 510 or temporary video 401 so they can ascertain where the video file's 310 starting point 531 should be. These thumbnail images 502 may also be displayed below the viewing window 501 in a sliding bar 590 that allows the user to see entirety of recorded video 510 and temporary video 401 in a file 310. The sliding bar 590 may allow the user to select the starting point 531 and ending point 532 for a video file without the need to scroll through all the recorded video 510 and temporary video 401 using the viewing window 501.

FIG. 5B is a screen illustrating the snipback interface 500 of the video recording system 10 setting an endpoint 532 to a video file 310. As shown in FIG. 5B, once a user sets a starting point 531 (shown in FIG. 5A) they may then select an endpoint 532 for the video 310 that may encompass both recorded video 510 and temporary video 401. The endpoint 532 may be set via the same snipback interface 500 and scrolling touchscreen controls discussed in FIG. 5A, with the user scrolling through the recorded video 510 and temporary video 401 via touchscreen control and selecting the endpoint 532 for the video by scrolling a desired endpoint 532 into a viewing window 501. The endpoint 532 may also be selected via the sliding bar 590.

As shown in FIGS. 5A and 5B, in an embodiment, the snipback interface 500 may include a coarse selection bar, the sliding bar 590, to permit large changes in the starting point 531 and the endpoint 532. The snipback interface 500 may also include a fine selection bar 520 to permit fine selection of the starting point 531 and the endpoint 532 on a frame-by-frame basis. The fine selection bar 520 that may toggle between a start selection mode and an end selection mode to permit the user to select both the starting point 531 and the endpoint 532. The fine selection bar 520 may include a scrollable series of video frames to permit the user to scroll linearly along the video of the temporary file storage arrangement 400 in the forward and backward directions. In an embodiment, the user may scroll by using a right swipe gesture to move backwards in video time, and a left swipe gesture to move forwards in time. When editing the start point 531, the right swipe gesture adds video and the left swipe gesture removes video. Conversely, when editing the endpoint 532, the right swipe gesture removes video and the left swipe gesture adds video. Whenever the user updates either the starting point 531 and the endpoint 532 in either the sliding bar 590 or the fine selection bar 520, the other of the sliding bar 590 or the fine selection bar 520 may be updated to reflect the change.

The sliding bar 590 may include one or more thumbnail frames of the temporary file storage arrangement 400. The sliding bar 590 may includes a start time slider 591 and an end time slider 592. Both the start time slider 591 and the end time slider 592 may be moved along the sliding bar 590 using a drag gesture. The sliding bar 590 may include various locations along its length that the start time slider 591 and the end time slider 592 may be dragged to. In an embodiment, the locations may permit pixel-by-pixel dragging of the start time slider 591 and the end time slider 592. In another embodiment, the locations may be the thumbnail frames of the sliding bar 590. Each location along the sliding bar 590 may correspond to a time point of the video in the temporary file storage arrangement 400.

In response to the user dragging the start time slider 591 to a first location, the starting point 531 may be updated based on a time point corresponding to the first location. Additionally, the fine selection bar 520 may be placed in a start selection mode and updated to the start time point. Similarly, in response to the user dragging the end time slider 592 to a second location, the endpoint 532 may be updated based on a time point corresponding to the second location. Also, the fine selection bar 520 may be placed in an end selection mode and updated to the endpoint 532.

In the start selection mode, the starting point 531 may be updated in response to a scroll gesture on the fine selection bar 520. A central frame of the movable series of video frames may be displayed in the viewing window 501. As the user scrolls through the video frames, the video frame in the central frame may be updated as the starting point 531. Likewise, in an end selection mode, in response to a scroll gesture, the end point 532 may be updated to the central frame of the movable series of video frames. The user may then scroll through the video frames to update the endpoint 532. The viewing window 501 may include a play button 503 that the user may press to view the video file 310 as currently edited. When the user is in end selection mode, pressing the play button 503 may result in playback of a few seconds before the endpoint 532. For example, in an embodiment, the final three seconds are played back when pressing the play button 503 in end selection mode.

Figure 6A:
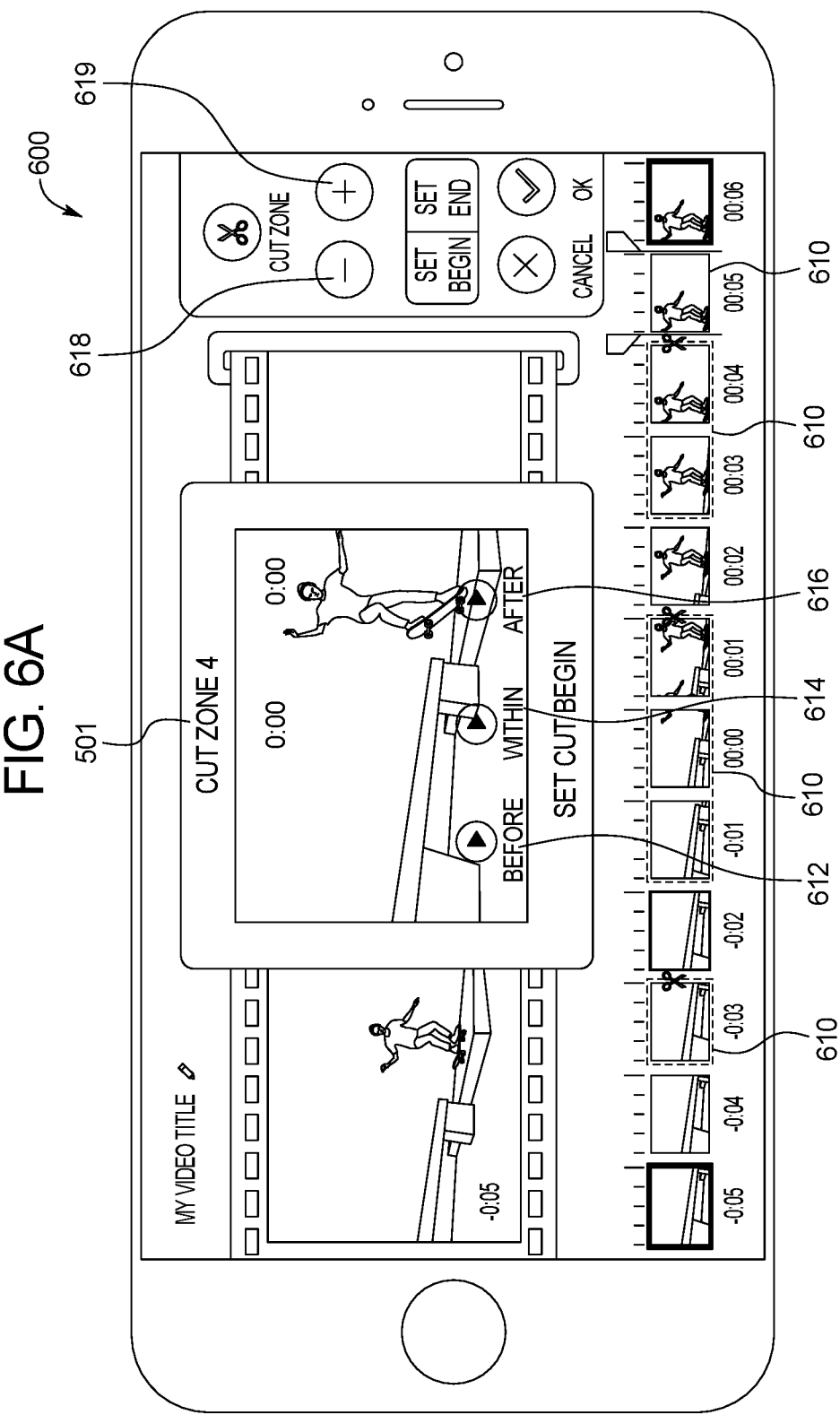
FIG. 6A is a screen illustrating the trimming interface of the video recording system to edit the starting point of the section to be trimmed.

FIG. 6A is a screen illustrating the trimming interface 600 of the video recording system 10 cutting out a segment 610 of a video file 310. As shown in FIG. 6A, the snipback video system 10 can remove segments 610 of video file 310 to make the video file 310 more size efficient. To achieve this shortened state, the snipback system 10 may utilize a video trimming interface 600 that is similar in design to the interface 500 discussed in FIG. 5A and FIG. 5B. The trimming interface 600 may feature touchscreen controls that allow the user to scroll through the entirety of a video file 310 while viewing what is occurring in the video file 310 via a viewing window 501. The user may click a segment 610 to edit that segment. When editing a segment 610, the user may click a before button 612 to play the video file 310 just before the segment 610. Similarly, the user may click an after button 616 to play the video file just after the segment 610. The user may also press a within button 614 to play the video of the segment 610 that will be removed from the video file 310. Further shown in FIG. 6A, when editing out a segment 610 of a video file 310, the user first selects a starting point 531 for the portion of the video file 310 to be removed. If the user decides to add another segment 610 to be removed, the user may click an add segment button 619, and if the user decides to remove a segment 610 (that is, keep the segment 610), the user may click a remove segment button 618.

Figure 6B:
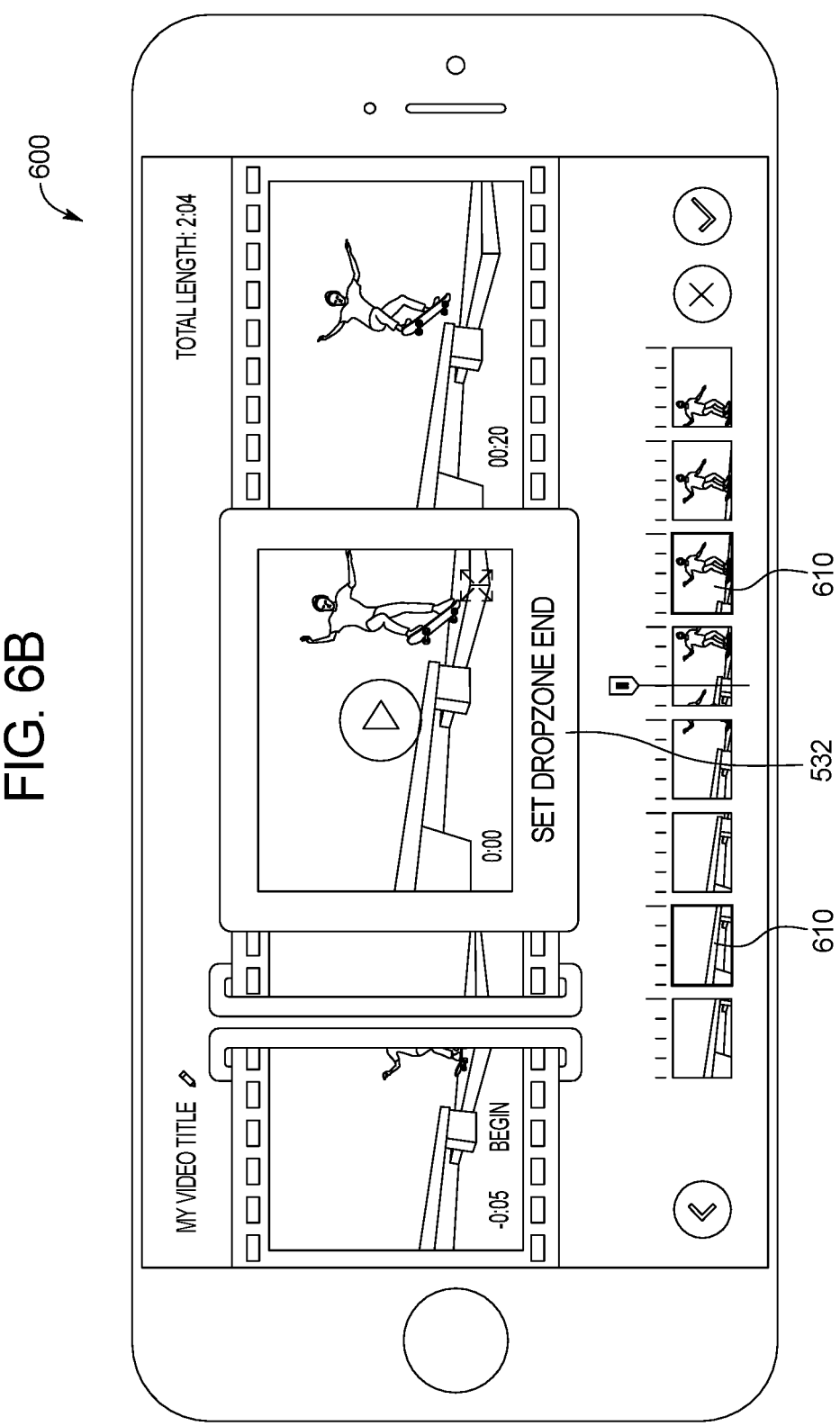
FIG. 6B is a screen illustrating the trimming interface of the video recording system to edit the endpoint of the section to be trimmed.

FIG. 6B is a screen illustrating the trimming interface 600 of the video recording system 10 setting an endpoint 532 when removing a segment 610 of a video file 310. As shown in FIG. 6B, the snipback system may utilize a trimming interface 600. This interface 600 may feature touchscreen controls that allow the user to scroll through the entirety of a video file 310 and view what is occurring in the video file 310 via a viewing window 501. Further shown in FIG. 6B, when editing out a segment 610 of a video file 310, after the user selects a starting point 531 for the portion of the video file 310 to be edited out (shown in FIG. 6A), the user may then select an endpoint 532. Once the endpoint 532 is selected, the system 10 may remove the portion indicated from the video file 310.

Figure 7A:
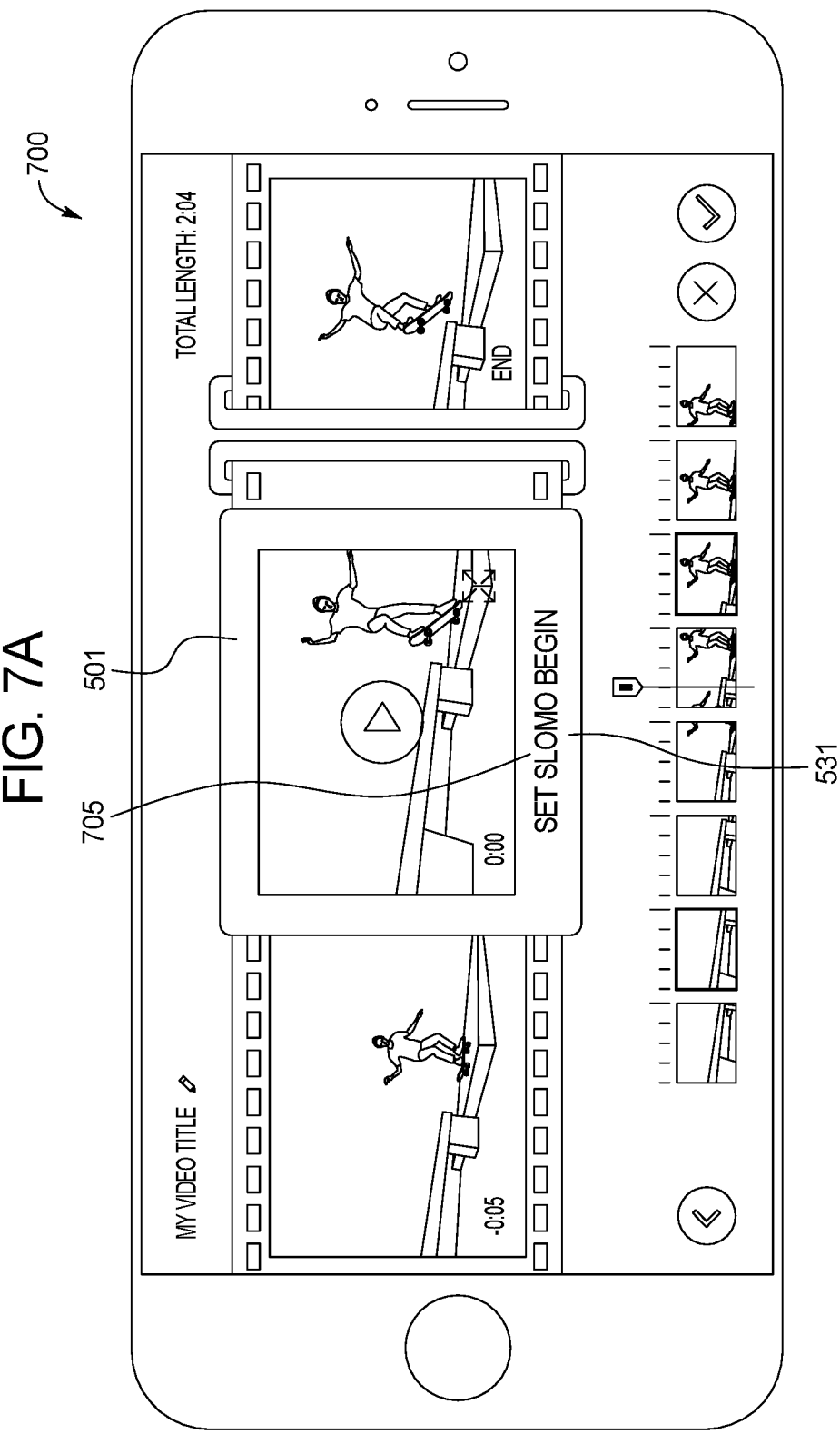
FIG. 7A is a screen illustrating the special effects interface of the video recording system adding a starting point of a special effect to a video file.

FIG. 7A screen illustrating the special effects interface 700 of the video recording system 10 adding a special effect 705 to a video file 310. As shown in FIG. 7A, the snipback system 10 may utilize a special effects interface 700, similar to the touchscreen interfaces discussed in figures five and six to also add special effects 705 to a video file 310. The special effect 705 being added in FIG. 7A is a slow motion effect, but other effects such as fast forward and music 706 may be added to a video file 310 utilizing the same interface 700. To add an effect 705 or music 706, the user may first select a starting point 531 for the effect 705 or music 706 to begin via a viewing window 501. In other embodiments, the special effects interface 700 may additionally include a before button 612, an after button 616 and a within button 614 as discussed with respect to FIG. 6A.

FIG. 7B is a screen illustrating special effects interface 700 of the video recording system 10 setting an endpoint 532 for a special effect 705. As shown in FIG. 7B, the snipback system 10 may be used to add special effects or music to a video file 310. To do so, a user may first select a starting point 532 for the effect 705 or music 706 to begin via a viewing window 501 (discussed in FIG. 7A) and then select an endpoint 532 for the effect 705 or music 706 via the effects interface 700.

FIG. 8A is a screen illustrating the sharing and settings menu 140. As shown in FIG. 8A, the sharing and settings menu 140 may feature access to sharing options, special effects, camera and application settings, and storage options.

FIG. 8B is a screen illustrating the sharing options displayed by the sharing and settings menu 140. As shown in FIG. 8B, when a user selects to share a video from the menu 140 they are provided with links 321 to numerous different sharing mediums including email, social media, and cloud storage services. Also, as shown in FIG. 8B, in some embodiments, when selecting a starting point 531, the user may select from various snipback amounts, such as five seconds, ten seconds, fifteen seconds, etc.

Referring back to FIG. 2, the user device 30 may include a memory interface 102, controllers 103, such as one or more data processors, image processors and/or central processors, and a peripherals interface 106. The memory interface 102, the one or more controllers 103 and/or the peripherals interface 106 can be separate components or can be integrated in one or more integrated circuits. The various components in the user device 30 can be coupled by one or more communication buses or signal lines, as will be recognized by those skilled in the art.

Sensors, devices, and additional subsystems can be coupled to the peripherals interface 106 to facilitate various functionalities. For example, a motion sensor 108 (e.g., a gyroscope), a light sensor 163, and positioning sensors 112 (e.g., GPS receiver, accelerometer) can be coupled to the peripherals interface 106 to facilitate the orientation, lighting, and positioning functions described further herein. Other sensors 114 can also be connected to the peripherals interface 106, such as a proximity sensor, a temperature sensor, a biometric sensor, or other sensing device, to facilitate related functionalities.

A camera subsystem 116 and an optical sensor 118 (e.g., a charged coupled device (CCD) or a complementary metal-oxide semiconductor (CMOS) optical sensor) can be utilized to facilitate camera functions, such as recording photographs and video clips.

Communication functions can be facilitated through a network interface, such as one or more wireless communication subsystems 120, which can include radio frequency receivers and transmitters and/or optical (e.g., infrared) receivers and transmitters. The specific design and implementation of the communication subsystem 120 can depend on the communication network(s) over which the user device 30 is intended to operate. For example, the user device 30 can include communication subsystems 120 designed to operate over a GSM network, a GPRS network, an EDGE network, a Wi-Fi or Imax network, and a Bluetooth network. In particular, the wireless communication subsystems 120 may include hosting protocols such that the user device 30 may be configured as a base station for other wireless devices.

An audio subsystem 122 can be coupled to a speaker 124 and a microphone 126 to facilitate voice-enabled functions, such as voice recognition, voice replication, digital recording, and telephony functions.

The I/O subsystem 128 may include a touch screen controller 130 and/or other input controller(s) 132. The touch-screen controller 130 can be coupled to a touch screen 134, such as a touch screen. The touch screen 134 and touch screen controller 130 can, for example, detect contact and movement, or break thereof, using any of a plurality of touch sensitivity technologies, including but not limited to capacitive, resistive, infrared, and surface acoustic wave technologies, as well as other proximity sensor arrays or other elements for determining one or more points of contact with the touch screen 134. The other input controller(s) 132 can be coupled to other input/control devices 136, such as one or more buttons, rocker switches, thumb-wheel, infrared port, USB port, and/or a pointer device such as a stylus. The one or more buttons (not shown) can include an up/down button for volume control of the speaker 124 and/or the microphone 126.

The memory interface 102 may be coupled to memory 138. The memory 138 can include high-speed random access memory and/or non-volatile memory, such as one or more magnetic disk storage devices, one or more optical storage devices, and/or flash memory (e.g., NAND, NOR). The memory 138 may store operating system instructions 140, such as Darwin, RTXC, LINUX, UNIX, OS X, iOS, ANDROID, BLACKBERRY OS, BLACKBERRY 10, WINDOWS, or an embedded operating system such as VxWorks. The operating system instructions 140 may include instructions for handling basic system services and for performing hardware dependent tasks. In some implementations, the operating system instructions 140 can be a kernel (e.g., UNIX kernel).

The memory 138 may also store communication instructions 142 to facilitate communicating with one or more additional devices, one or more computers and/or one or more servers. The memory 138 may include graphical user interface instructions 144 to facilitate graphic user interface processing; sensor processing instructions 146 to facilitate sensor-related processing and functions; phone instructions 148 to facilitate phone-related processes and functions; electronic messaging instructions 150 to facilitate electronic-messaging related processes and functions; web browsing instructions 152 to facilitate web browsing-related processes and functions; media processing instructions 154 to facilitate media processing-related processes and functions; GPS/Navigation instructions 156 to facilitate GPS and navigation-related processes and instructions; camera instructions 158 to facilitate camera-related processes and functions; and/or other software instructions 160 to facilitate other processes and functions (e.g., access control management functions, etc.). The memory 138 may also store other software instructions controlling other processes and functions of the user device 30 as will be recognized by those skilled in the art. In some implementations, the media processing instructions 154 are divided into audio processing instructions and video processing instructions to facilitate audio processing-related processes and functions and video processing-related processes and functions, respectively. An activation record and International Mobile Equipment Identity (IMEI) 162 or similar hardware identifier can also be stored in memory 138.

Each of the above identified instructions and applications can correspond to a set of instructions for performing one or more functions described herein. These instructions need not be implemented as separate software programs, procedures, or modules. The memory 138 can include additional instructions or fewer instructions. Furthermore, various functions of the user device 30 may be implemented in hardware and/or in software, including in one or more signal processing and/or application specific integrated circuits. Accordingly, the user device 30, as shown in FIG. 2, may be adapted to perform any combination of the functionality described herein.

Aspects of the systems and methods described herein are controlled by one or more controllers 103. The one or more controllers 103 may be adapted run a variety of application programs, access and store data, including accessing and storing data in associated databases, and enable one or more interactions via the user device 30. Typically, the one or more controllers 103 are implemented by one or more programmable data processing devices. The hardware elements, operating systems, and programming languages of such devices are conventional in nature, and it is presumed that those skilled in the art are adequately familiar therewith.

For example, the one or more controllers 103 may be a PC based implementation of a central control processing system utilizing a central processing unit (CPU), memories and an interconnect bus. The CPU may contain a single microprocessor, or it may contain a plurality of microcontrollers 103 for configuring the CPU as a multi-processor system. The memories include a main memory, such as a dynamic random access memory (DRAM) and cache, as well as a read only memory, such as a PROM, EPROM, FLASH-EPROM, or the like. The system may also include any form of volatile or non-volatile memory. In operation, the main memory is non-transitory and stores at least portions of instructions for execution by the CPU and data for processing in accord with the executed instructions.

The one or more controllers 103 may further include appropriate input/output ports for interconnection with one or more output displays (e.g., monitors, printers, touchscreen 134, motion-sensing input device 108, etc.) and one or more input mechanisms (e.g., keyboard, mouse, voice, touch, bioelectric devices, magnetic reader, RFID reader, barcode reader, touchscreen 134, motion-sensing input device 108, etc.) serving as one or more user interfaces for the processor. For example, the one or more controllers 103 may include a graphics subsystem to drive the output display. The links of the peripherals to the system may be wired connections or use wireless communications.

Although summarized above as a PC-type implementation, those skilled in the art will recognize that the one or more controllers 103 also encompasses systems such as host computers, servers, workstations, network terminals, and the like. Further one or more controllers 103 may be embodied in a user device 30, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a processor or other programmable equipment to perform the relevant steps, where the code or instructions are carried by or otherwise embodied in a medium readable by the processor or other machine. Instructions or code for implementing such operations may be in the form of computer instruction in any form (e.g., source code, object code, interpreted code, etc.) stored in or carried by any tangible readable medium.

It should be noted that various changes and modifications to the presently preferred embodiments described herein will be apparent to those skilled in the art. Such changes and modifications may be made without departing from the spirit and scope of the present invention and without diminishing its attendant advantage.

The invention claimed is:

1. A video recording system comprising:
   a camera sensor;
   a controller in communication with the camera sensor;
   a memory in communication with the controller, the memory including a video recording application that, when executed by the controller, cause the controller to:
      continuously store video in a temporary file storage arrangement from the camera sensor,
      display a user interface including displaying the video and a record button,
      upon receiving an activation of the record button at a first time, record the first time as a start time point,
      upon receiving an activation of a stop recording button, at a second time, mark the second time as an end time point,
      display a user interface including:
         a coarse selection bar including one or more thumbnail frames depicting frames of the temporary file storage arrangement, wherein the coarse selection bar includes a start time slider and an end time slider, wherein both the start time slider and the end time slider may be moved along the coarse selection bar using a drag gesture, wherein each location along the coarse selection bar corresponds to a time point of the video in the temporary file storage arrangement; and
         a fine selection bar that toggles between a start selection mode and an end selection mode, wherein the fine selection bar includes a scrollable series of video frames to permit the user to scroll linearly along the video of the temporary file storage arrangement in the forward and backward directions, wherein, in a start selection mode, in response to a scroll gesture, the start time point is set to a selected frame of the movable series of video frames, wherein, in an end selection mode, in response to a scroll gesture, the end time point is set to a selected frame of the movable series of video frames, wherein, in response to the user dragging the start time slider to a first location, the start time point is updated based on a time point corresponding to the first location and the fine selection bar is placed in a start selection mode and the selected frame is updated to the start time point, wherein, in response to the user dragging the end time slider to a second location, the end time point is updated based on a time point corresponding to the second location and the fine selection bar is placed in an end selection mode and the selected frame is updated to the end time point, and
      generate a video file from a subset of the temporary file storage arrangement, the video file beginning at a video frame associated with the start time point and ending with the video frame associated with the end time point.

2. The video recording system of claim 1, wherein the video recording application causes the controller to:
   update the user interface to include a stop recording button.

3. The system of claim 1, wherein the video recording application further causes the controller to:
   display a user interface including one or more selectable video files,
   receive a selection of a first video file,
   receive a selection of a second video file,
   generate a merged video file that includes the selected first video file concatenated with the selected second video file.

4. The system of claim 1, wherein the video recording application causes the controller to
   receive a selection of a video file to crop,
   display, on the user interface, one or more selectable crop start time points of the video file,
   receive a selection of a crop start time point from the one or more selectable crop start time points,
   display, on the user interface, one or more selectable crop end time points of the video file,
   receive a selection of a crop end time point from the one or more selectable crop end time points,
   generate a second video file from the video file by removing video between the crop start time point to the crop end time point.

5. The system of claim 1, wherein the video recording application causes the controller to
   receive a selection of a video file to add a special effect to,
   receive a selection of a special effect,
   display one or more selectable begin time points that indicate where the special effect should begin,
   receive a selection of a begin time point of the one or more selectable begin time points,
   display one or more selectable finish time points that indicate where the special effect should finish,
   receive a selection of a finish time point of the one or more selectable finish time points,
   generate a second video file from the video file by applying the special effect to video of the video file between the begin time point to the finish time point.

6. The system of claim 1, wherein the activation of the record button and the activation of the stop recording button is caused by a swipe gesture.

* * * * *